116,374

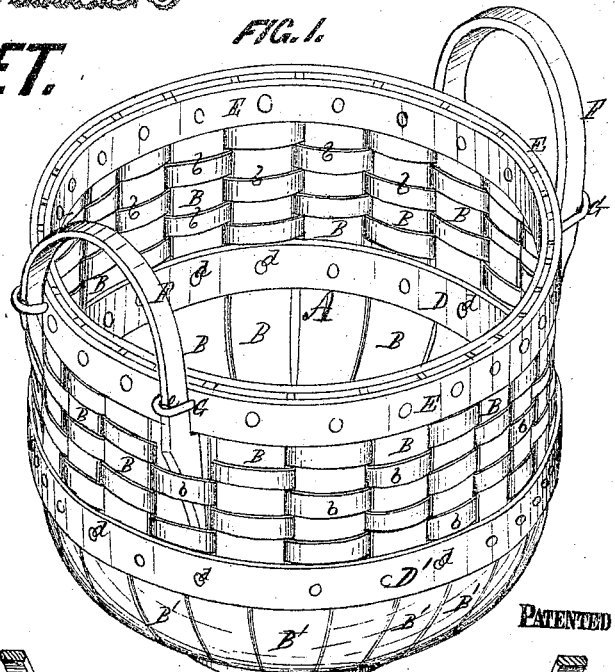
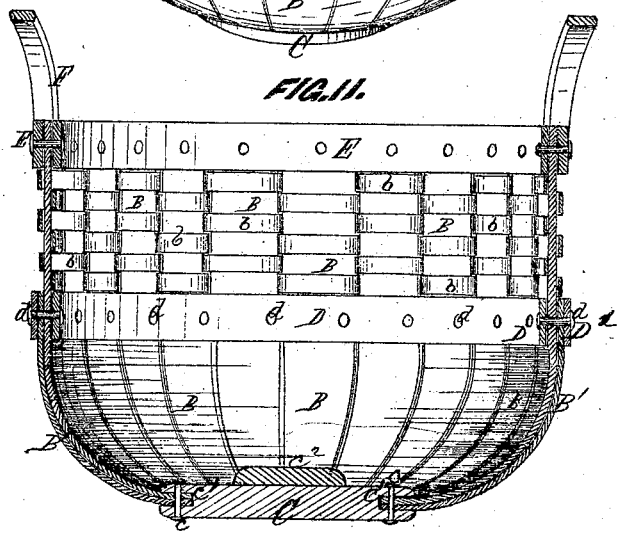
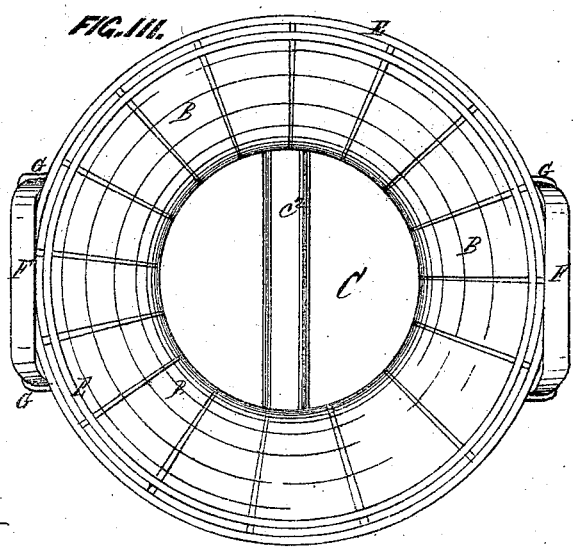

UNITED STATES PATENT OFFICE.

BENJAMIN FRANKLIN TUTHILL, OF CHICAGO, ILLINOIS, ASSIGNOR OF ONE-HALF HIS RIGHT TO STEPHEN V. R. TUTHILL, OF SAME PLACE.

IMPROVEMENT IN BASKETS.

Specification forming part of Letters Patent No. 116,374, dated June 27, 1871.

*To all whom it may concern:*

Be it known that I, BENJAMIN FRANKLIN TUTHILL, of the city of Chicago, in the county of Cook and State of Illinois, have invented certain Improvements in the Construction of Baskets, of which the following is a specification:

This invention has reference to the construction of any common form of basket; and consists in the peculiar combination of the standards and splints usually employed, in the manner hereinafter described.

In the drawing, Figure I is a perspective view of my improved basket; Fig. II, a vertical section; Fig. III, a top view.

A represents a common form of grain or fruit basket. The top is formed in the usual manner by interweaving splints $b$ with the standards B. The lower portion consists of a double row of standards, B B', secured by rivets $c$ in a groove, $c'$, of the base-piece C. The two rows of standards B B' are so arranged as to lap joints. The base-piece C is preferably made of sufficient size to furnish a good resting surface for the basket, and has one or more cleats, $C^2$, across its upper surface to counteract any tendency to warp or crack. At the point where the standards commence to be woven in with the splints is an outer and also an inner hoop, D D', fastened together with rivets $d$, headed at one end, and penetrating through both hoop and standards so as to be clinched on the other. The top of the basket is hooped in the same manner as the center, the standards B being cut flush with the upper edge of the hoops E so as to present an even surface upon the top. The handles F are attached to the outside of the basket by staples G, which fit into notches $e$ in the handles, and penetrate through both loops E, so as to clinch on the inside of the basket. It is desirable to have the shank of each handle extend so far down the side of the basket as to be crossed and held securely by both the splints $b$ and central hoop D.

The advantages secured in constructing a basket in this form are: First, great durability; second, convenience. The bottom and sides near the bottom are subjected to the greatest wear and give out the soonest. The first great cause of breakage is the tearing away of the splints by catching against obstructions on the ground. This difficulty is obviated by presenting a smooth bottom and smooth sides to any resisting surface. The sides below the central hoop being double, with lapped joints, a very tight bottom is secured to the basket. In the central double hoops D D' are embraced two advantages: First, they bind and brace the sides in the most secure manner; and second, the outer hoop D' affords a resting place when one basket is set upon another. When ordinary baskets are placed upon and within each other they are liable not only to become wedged together so as to occasion difficulty in their separation, but the splints are liable to become torn and broken. This difficulty is entirely obviated by the hoop D', which forms a shoulder and has the top hoop E for a bearing.

Having thus fully described the construction of and advantages secured by my method of building baskets, I will proceed to claim what I believe to be original with myself, and which I desire to secure by Letters Patent, namely:

The basket A, constructed with the lower portion formed of the standards B B' and base piece C, in combination with the upper part of wovenwork, substantially as described, for the purpose specified.

In witness whereof I have hereunto signed my name in the presence of two subscribing witnesses.

BENJAMIN FRANKLIN TUTHILL.

Witnesses:
J. B. GRIFENHAGEN,
G. I. BUNKER.